United States Patent [19]

Carrigan

[11] 4,164,076

[45] Aug. 14, 1979

[54] UNIVERSAL DIE MOUNTING PLATE SYSTEM

[75] Inventor: Robert J. Carrigan, Enfield, Conn.

[73] Assignee: Westvaco Corporation, New York, N.Y.

[21] Appl. No.: 882,399

[22] Filed: Mar. 1, 1978

[51] Int. Cl.² .............................................. B23Q 3/00
[52] U.S. Cl. ................................. 33/181 R; 33/185 R; 269/321 A
[58] Field of Search ......... 33/181 R, 174 TA, 174 G, 33/174 TC, 174 TB, 180 R, 185 R, 19 A, 19 B, 174 TD; 269/321 A; 51/216 H

[56] References Cited

U.S. PATENT DOCUMENTS

| | | | |
|---|---|---|---|
| 95,337 | 9/1869 | Goulden | 269/321 A |
| 724,116 | 3/1903 | Malen | 85/41 |
| 2,079,323 | 5/1937 | Kokotiak | 269/321 A |
| 2,147,800 | 2/1939 | Sadowski | 269/321 A |
| 2,324,476 | 7/1943 | Becker | 269/321 A |
| 2,621,807 | 12/1952 | Rendrick | 269/321 A |
| 3,175,820 | 3/1965 | Schiler | 269/321 A |
| 3,298,681 | 1/1967 | Youngblood | 269/321 A |

FOREIGN PATENT DOCUMENTS 312684  7/1969  Sweden ............................ 33/174 TD

*Primary Examiner*—Willis Little
*Attorney, Agent, or Firm*—W. Allen Marcontell; Ernest B. Lipscomb, III

[57] ABSTRACT

A machine tool fixture with particular utility as a mounting and backing plate for a sheet cutting die is provided with a unique pattern of tool mounting slots universally adaptable to a wide range of die sizes and to any die tool in a capital inventory. Also disclosed is a tool mounting point locating jig and method of use corresponding with the present fixture.

5 Claims, 6 Drawing Figures

4,164,076

UNIVERSAL DIE MOUNTING PLATE SYSTEM

BACKGROUND OF THE INVENTION

1. Field Of The Invention

The present invention relates to machine tool jigs and fixtures. More specifically, the present invention relates to a cutting die press backing plate fixture and jig means for locating mounting points on a cutting die tool compatible with the present fixture.

2. Background Of The Invention

Mass production of complex article shapes cut from paper sheet such as envelope blanks includes a die cutting step wherein an approximately 500 sheet stack of envelope grade paper is simultaneously sheared by the single stroke of a die cutter mounted on the platen of a die cutting press. This system requires a cutting die formed from steel bar stock such as ½"×4" forged to the peripherial outline of the article or envelope blank. For product size and shape flexibility, such cutting dies are removably secured to a mounting plate and the mounting plate removably secured to the backup plate structure of the press.

As the die advances into the sheet stack, the severed core of product is wedged within the peripherial enclosure of the die cutter structure. For removal, a fluid powered ejector ram is positioned coaxially of the backup plate to stroke through an aperture at the backup and mounting plate center against the cut article core wedged within the die. Such ejection forces are nearly as great as the original shear force required for the die cut. Consequently, the die mounting plate must be of heavy steel plate structure to resist lenticular deformation due to article ejection forces. For the same reason, the cutting die must be strongly secured to the mounting plate in addition to being conveniently removable therefrom.

A large producer of such sheet articles may have many different sizes of such die mounting plates (measured by the plate diameter) to accommodate the full spectrum of die sizes and shapes corresponding to his product line. Moreover, such a manufacturer may have numerous, geographically dispersed, production facilities.

Each product cutting die represents a substantial capital investment of time and labor. Although cutting dies are duplicated when necessary, such duplication is minimized due to the cost. Accordingly, it is customary for a manufacturer to ship a die between production facilities to meet local needs rather than duplicate the die at each facility. Consequently, each facility must prepare a companion mounting plate for each such transient die when first received.

If the foregoing example is expanded by hundreds of articles in a manufacturer's product spectrum, the need for maximum interchangeability between cutting dies and mounting plates is manifest. A hinderance to such interchangeability in the past has been the strong but removable interface connection between the cutting die and mounting plate.

The prior art technique of such matching is to blind drill and tap the back edge of a cutting die for machine screws at empirically selected locations around the die periphery. The centerlines of such tapped holes are then accurately transferred to the backing plate for drilling. Of simultaneous consideration is the need for the die to be secured to the backing plate symmetrically about the press ram axis for equal distribution of cutting and ejection forces on the cutting and ejecting hydraulic cylinders.

After a mounting plate has been drilled to receive the minimum of 4 mounting machine screws for each of approximately six different cutting dies, all more or less symmetrically distributed about the plate axis, the mounting plate approaches saturation for one or both of two reasons. Either the plate surface becomes confused with many holes making it difficult to find the correct hole combination for a particular cutting die or, the plate is structurally weakened by the excess removal of material.

When there are hundreds of such dies of diverse sizes and shapes, monumental mounting plate inventory storage and retrieval problems are created in order to find the correct mounting plate that has been drilled to receive a particular cutting die. Furthermore, since a single mounting plate is drilled to accommodate six or more dies, production conflicts arise when production needs require simultaneous use of two or more dies adapted for mounting on the same mounting plate.

Consequently, an unfulfilled desire of the industry has been to conceive a mounting system whereby any cutting die of a product spectrum may be secured to any appropriately sized mounting plate. One prior art attempt at solving this dilemma has taken the form of predrilled mounting plates according to a preconceived pattern. Unfortunately, no drill pattern has been conceived that will accommodate the infinite variety of size and shape dies required by the market. Often, the number and/or location of predrilled mounting plate holes is not compatible with the mounting strength requirements of a particular die configuration.

Another prior art approach to the problem is to cut a plurality of four to eight continuous radial slots in a mounting plate. Although this approach provides a sufficient number of universally aligned mounting points, the quantity of material removed from the mounting plate by the long slots unacceptably compromises the structural strength of the plate.

It is, therefore, an object of the present invention to teach a universal method and apparatus for combining cutting dies and mounting plates.

Another object of the present invention is to teach a pre-cut die mounting aperture configuration in mounting plates that is universally compatible with any die and does not compromise the structural strength of the plate.

Another object of the present invention is to teach a method and apparatus for quickly and accurately locating appropriate machine screw mounting points on any cutting die having compatability with a universal mounting plate aperture pattern.

Another object of the present invention is to teach a method and apparatus for quickly and accurately locating appropriate machine screw mounting points on a complex cutting die configuration for symmetrical security of the die about a respective mounting plate and backing plate axis.

SUMMARY

These and other objects of the present invention are achieved by a distinctive slot aperture configuration in a mounting plate including a plurality of equiangularly distributed, parallel lines of spaced, short slots.

Also taught by the present invention is a method of locating machine screw holes in a cutting die edge compatiable with the present mounting plate slot pattern by the use of a master layout pattern fabricated from transparent material and having a slot configuration identical to that of the die mounting plates. This pattern is superimposed with concentric circle indicia about the slot radii axis to aid in locating the symmetrical center of an irregular shaped die.

BRIEF DESCRIPTION OF THE DRAWING

Relative to the several figures of the drawing wherein like or similar reference characters designate like or similar elements.

DESCRIPTION OF THE PREFERRED EMBODIMENT

Figure 1:
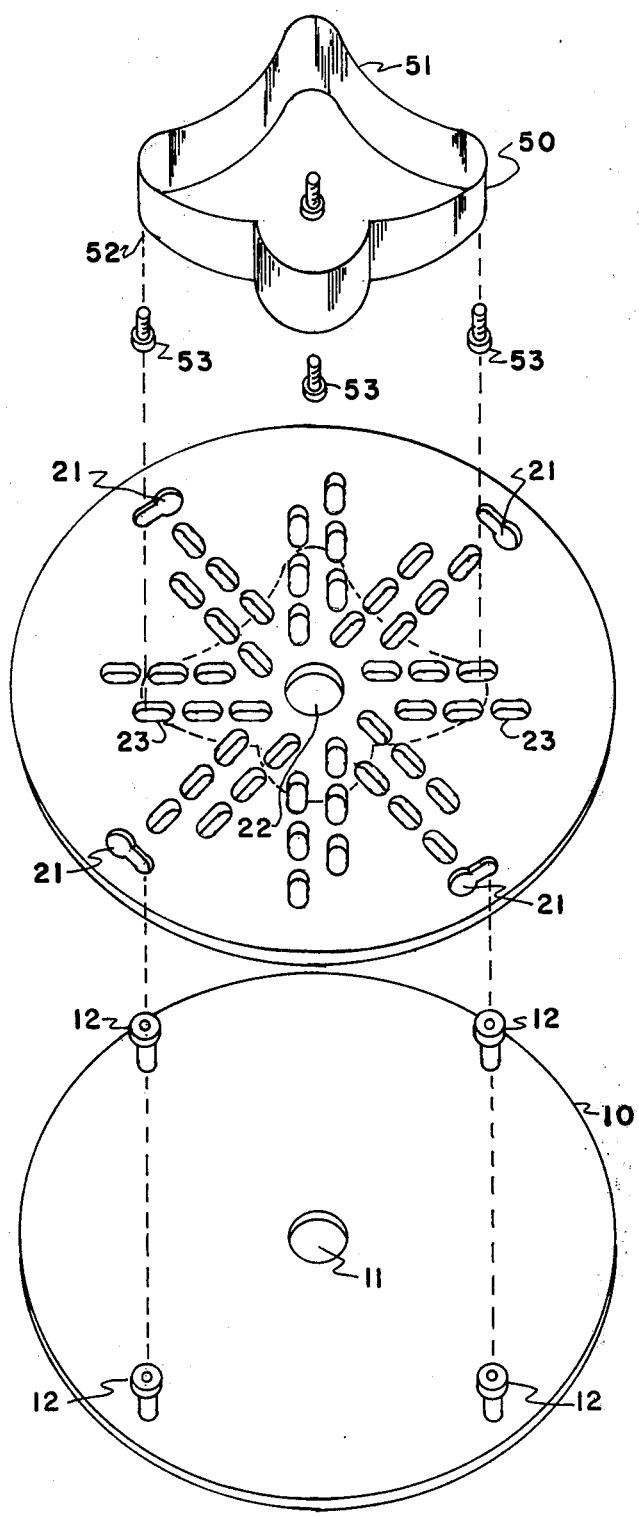
FIG. 1 is an assembly perspective of the present invention.

FIG. 1 illustrates those elements of a die press essential to the present invention including a press backing plate 10 having an ejector aperture 11 at the axial center thereof and several plate mounting lugs 12.

Such backing plate structure is secured to the press ram not shown for reciprocable movement therewith. Also secured to the press ram is an ejector element 14 comprising an ejector ram 15.

Adjacent the pressure face of the backing plate is secured a die mounting plate 20 by means of key-hole slots 21 having layout alignment with the backing plate mounting lugs 12. An ejector aperture 22 is provided at the mounting plate center.

Numerous slot apertures 23 are provided in the face of the mounting plate in a pattern distinctive of the present invention.

A cutting die 50 forged from heavy steel flat bar stock has a cutting edge 51 ground from one edge flat of the die bar. The other edge flat 52 is ground to flat parallelism with the mounting plate face.

At locations around the die edge periphery selected to align with appropriate mounting plate slots 23, the die is blind drilled and tapped to receive machine screws 53.

Figure 4:
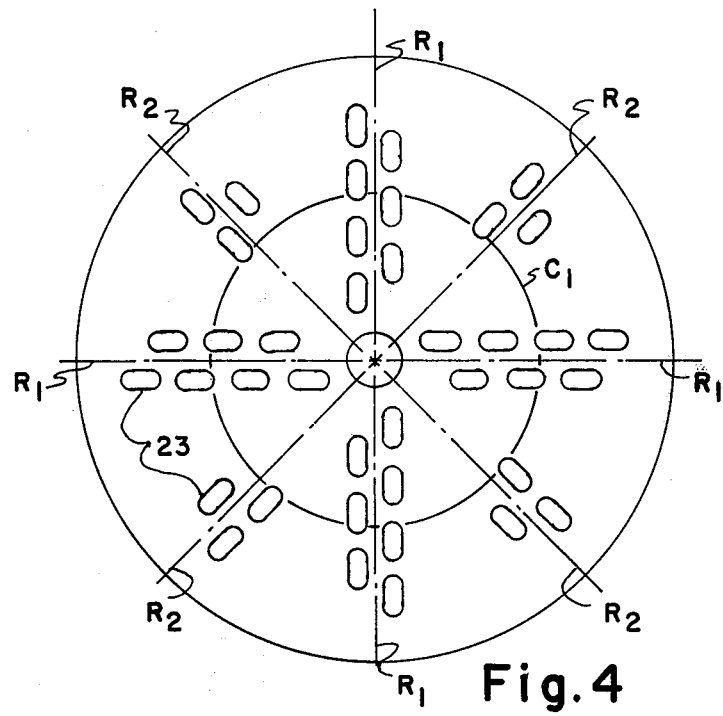
FIG. 4 is an alternative slot pattern of the invention for a press backing plate.

The mounting plate slot 23 layout has a generally radial pattern relative to the plate center. In other words, slot 23 groupings are aligned parallel to a selected number of equiangularly spaced radii R around the plate 20 circle. A preferred arrangement includes 8 radials R spaced at 45° around the plate circle. No criticality is to be attached to this particular number however, since the spectrum of different product lines may require more or less such radial groupings. Relevant to the determination of how many radials R are to be used is the size range a manufacturer's die inventory. Since one of the primary invention objectives is uniformity, the number of radials R serving the smallest plate size should also serve the largest plate size. However, there is no reason to preclude additional radial groups for the larger plate sizes. This arrangement is illustrated by FIG. 4 where four radial groupings $R_1$ of slots 23 serve all plate sizes and four additional slot groupings $R_2$ serve those plates having a circumference greater than $C_1$.

Figure 2:
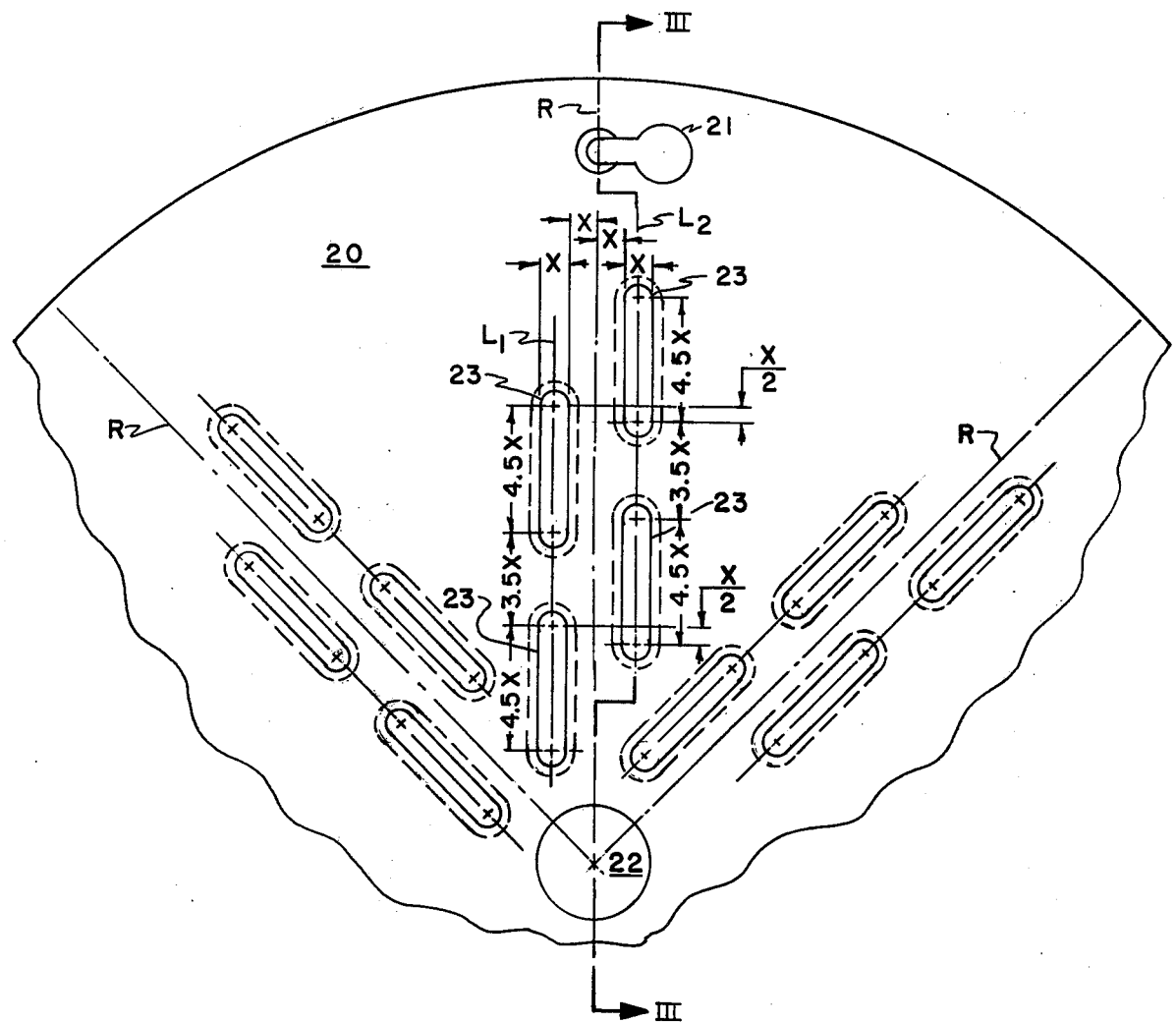
FIG. 2 is a plan detail of a press mounting plate constructed according to the present invention.
Figure 3:
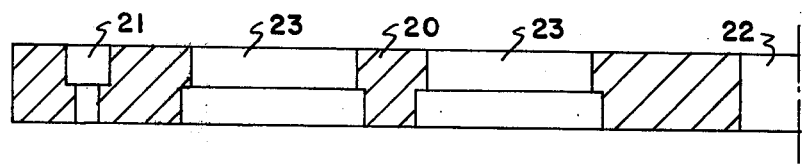
FIG. 3 is a sectional elevation of the plate illustrated by FIG. 2 taken along the cut-line III—III.

Each slot 23 grouping comprises two, spaced, parallel lines of slots $L_1$ and $L_2$ in offset alignment as shown in FIG. 2. A basic rule for governing the lateral spacing between the respective slot lines $L_1$ and $L_2$ as well as the separation distance between successive slots 23 in the same line is for as much plate material to be left undisturbed as is removed by a slot cut. However, if the slots are counter bored to recess the heads of the die mounting machine screws 53 below the back surface of plate 20, it is advisable to increase the magnitude of undisturbed material between adjacent slots.

Using the clearance drill diameter X of the appropriate die mounting screw as a reference dimension, the parallel axes of respective lines $L_1$ and $L_2$ are separated by a 3X dimension. If the counterbore diameter is 2X, X undisturbed material remains between adjacent slot counter bores.

Longitudinally, adjacent slots are spaced by 1.5X undisturbed material between counterbore cuts.

To provide full overlapping continuity of radially extending slot space, the centers of slot end cuts respective to lines $L_1$ and $L_2$ should lap by a distance of $\frac{1}{4}$X. Such overlaps may be greater but preferably not less if full radial slot continuity is to be provided.

These spacings dictate a slot length of 4.5X measured between end cut centers of the same slot and a distance of 3.5X measured between end cut centers of adjacent slots in the same line.

When the aforedescribed slot pattern is imposed upon all mounting plates 20 of a manufacturer's inventory, it may be seen that precut die mounting screw space within a given radial increment of plate surface is universal. Consequently, when a die 50 is compatibly drilled to mount on one plate, it will mount identically on all other plates of suitable size.

Figure 5:
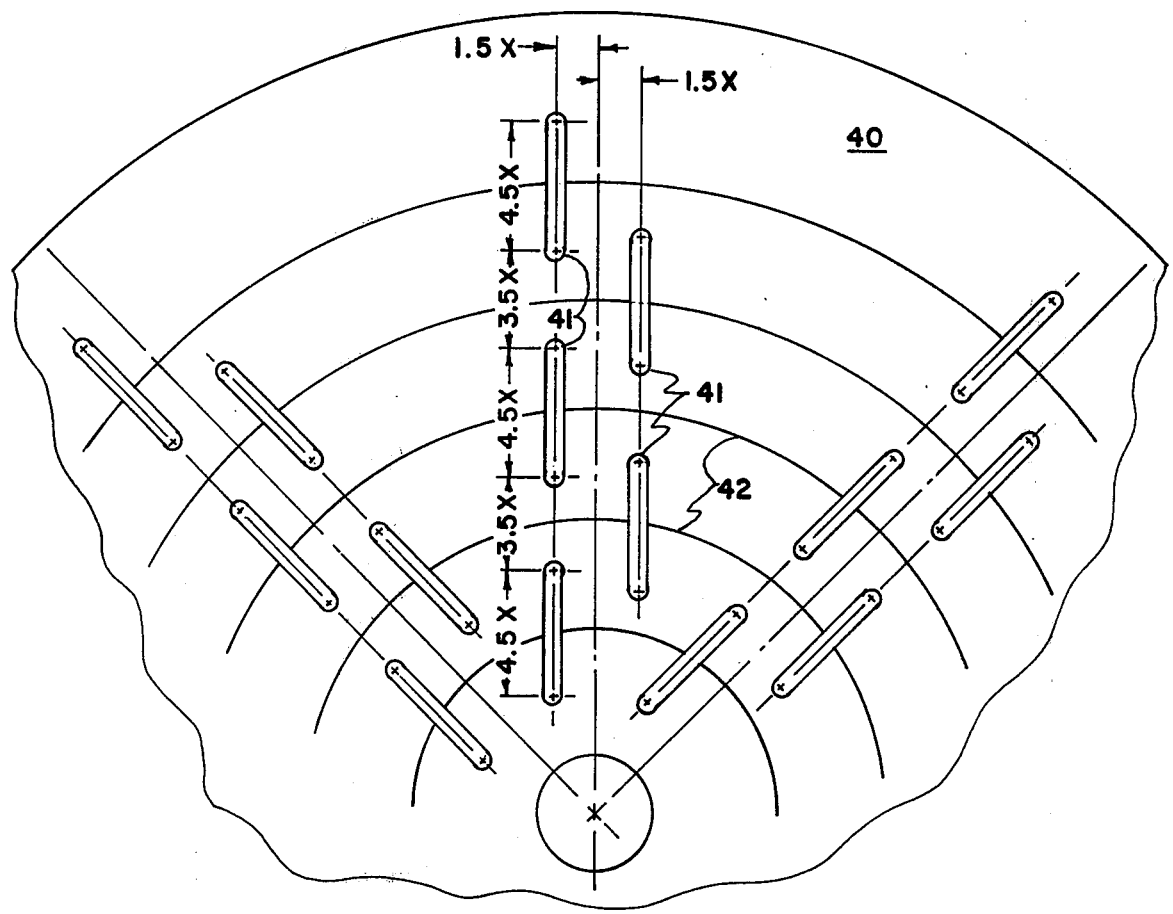
FIG. 5 is a plan detail of a tool marking jig constructed according to the present invention.

As a consequence of this universal mounting slot pattern, a pattern jig such as that of FIG. 5 may be prepared to simplify and expedite the location of die 50 mounting holes. For this purpose, a plate 40 of diametric size corresponding to the largest backing plate in an inventory and of suitably rigid transparent material such as Lexan or Plexiglas is laid out to the selected slot centerline spacing. This pattern jig 40 is cut, however, with very narrow scribing slots 41. Additionally, the bottom surface of the pattern jig 40 may be scribed with a series of concentric circle indicia 42 at convenient, radially uniform increments. It is also convenient to scribe or mark the radials R of the pattern jig 40 for each slot group and perhaps additional radials as required. The concentric circles are preferably color coded to preclude confusion of adjacent circles 42. Other indicia such as circles respective to the several backing plate sizes may also be scribed and color coded.

Figure 6:
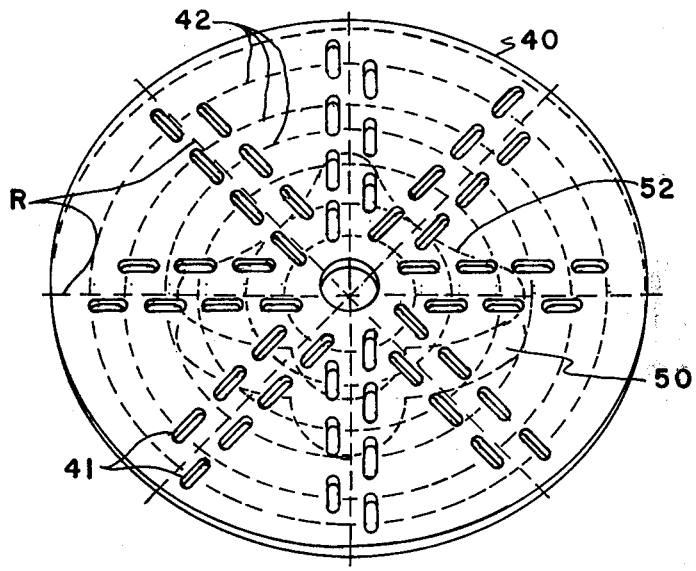
FIG. 6 is a perspective illustration of the jig and tool alignment step for the present invention method.

Use of such a pattern jig 40 is illustrated by FIG. 6 where the subject die 50 is supported by a suitable work surface with the plate mounting edge flat 52 topside. Pattern jig 40 is positioned over the die 50 and shifted manually until, by visual inspection relative to the concentric circles 42 and the radials R, a satisfactory symmetric position is located. Die edge flat 52 is then marked with a machinist's scribe through appropriately selected jig slots 41. These scribe marks will align with the centerlines of corresponding slots 23 in a mounting plate 20. Accordingly, the die flat is drilled and tapped for mounting screws 53 along these scribe marks.

Since all mounting plates in an inventory have slots at the same relative angle and radial location as that of the pattern jig 40 by which the mounting points were located, this die 50 may be secured to any mounting plate in the inventory.

Having fully described by invention, obvious modifications and innovations thereof falling within the scope of my appended claims will readily appear to those of ordinary skill in the art. Therefor, as my invention,

I claim:

1. A mounting plate for securing the position of a machine tool comprising a plurality of slot groupings extending radially from a plate center point, radial axes of each slot group being distributed substantially equiangularly about said centerpoint, each said slot grouping comprising at least two spaced lines of short, spaced slots extending parallel with the respective radial axis, said slots and spaces being aligned in radial sequence along a respective line and laterally offset by the slot and space sequence of said other line whereby a space of one line is laterally flanked by a slot in said other line.

2. A die mounting plate for a die press comprising a plurality of slot groupings extending radially from a center point of said plate, radial axes of each slot group distributed substantially equiangularly about said centerpoint, each said slot grouping comprising at least two spaced lines of short, spaced slots extending parallel with the respective radial axis, said slots and spaces being aligned in radial sequence along a respective line and laterally offset by the slot and space sequence of said other line whereby a space of one line is laterally flanked by a slot in said other line.

3. A pattern jig for locating mounting points in a die tool comprising a plate of rigid transparent material having a plurality of substantially uniformly spaced concentric circular indicia about a center point on at least one surface thereof, said plate having a plurality of slot groupings extending radially from said center point, radial axes of each slot group being distributed substantially equiangularly about said center point, each of said slot grouping comprising at least two spaced lines of short, spaced slots extending parallel with the respective radial axis, said slots and spaces being aligned in radial sequence along a respective line and laterally offset by the slot and space sequence of said other lines whereby a space in one line is laterally flanked by a slot in said other line.

4. A method of locating mounting points in a machine tool, said method comprising the steps of:
   A. Providing a substantially transparent scribing plate having narrow scribing slots therethrough distributed about the surface thereof in polar alignment with mounting slots in a corresponding tool mounting fixture, said scribing plate having a plurality of concentric circle indicia about a center point on at least one face thereof;
   B. Positioning said tool on a work surface with a fixture mounting surface topside;
   C. Positioning said scribing plate over said tool mounting surface with substantial symmetry about said center point and relative to said circular indicia;
   D. Scribing said fixture mounting surface through said slots at desired locations where said fixture mounting surface coincides with a scribing slot; and,
   E. Centering mounting points for said machine tool along said scribes.

5. A die mounting plate as described by claim 2 wherein centerlines of said parallel slot lines are laterally spaced by approximately three times the width space of said slots and the distance between adjacent slots in a respective slot line is between two and three times the width space of a slot.

* * * * *